(12) United States Patent
Novak

(10) Patent No.: US 6,196,680 B1
(45) Date of Patent: Mar. 6, 2001

(54) CHEMILUMINESCENT EYEGLASS FRAME

(75) Inventor: Craig Novak, Kennett Square, PA (US)

(73) Assignee: Unique Industries, Inc., Philadelphia, PA (US)

( * ) Notice: Subject to any disclaimer, the term of this patent is extended or adjusted under 35 U.S.C. 154(b) by 0 days.

(21) Appl. No.: 09/546,061

(22) Filed: Apr. 10, 2000

(51) Int. Cl.[7] .................................................. G02C 11/02
(52) U.S. Cl. ................................ 351/51; 351/41; 351/52; 351/158
(58) Field of Search ................................ 351/41, 51, 52, 351/158

(56) References Cited

U.S. PATENT DOCUMENTS 4,828,355 * 5/1989 Lipson ..................................... 351/51
5,946,071 * 8/1999 Feldman ................................. 351/51

* cited by examiner

Primary Examiner—Hung Xuan Dang
(74) Attorney, Agent, or Firm—Gerard F. Dunne

(57) ABSTRACT

A chemiluminescent novelty eyeglass frame has curved portions which will extend proximate the eyes of the user. The curved portions are formed with channels which are adapted to receive compartmented ampules containing a chemiluminescent solution separated from an activator. A frangible barrier is provided in the ampules, and the barrier is ruptured by bending the ampules for insertion into the channels. In this way, the chemiluminescent solution and activator mix to produce chemiluminescent light emanating from the frame upon insertion of the ampules into the channels of the curved portions of the eyeglass frame.

1 Claim, 4 Drawing Sheets

CHEMILUMINESCENT EYEGLASS FRAME

FIELD OF THE INVENTION

The present invention relates to novelty products, particularly novelty eyeglass frames which may emit chemiluminescent light.

BACKGROUND OF THE INVENTION

Various novelty products are known which are adapted to emit a chemiluminescent light; and novelty eyeglass frames have been developed to provide eyeglasses in novelty shapes such as the shape of a year to be used during celebrations for the New Year. Note, for example, U.S. design Pat. No. Des 335,134.

Novelty products have been proposed which include chemiluminescent chemicals to provide a "glow", effect. Typically, chemiluminescent products require an oxalate solution containing a fluorescent dye, and an activator solution held separately from the oxalate solution. In order to provide chemiluminescence, the activator and the oxalate solution must be mixed; and chemiluminescence will result. However, the chemiluminescence will eventually fade; and thus it is necessary not to mix the oxalate solution with the activator solution until such time as the chemiluminescence is actually desired.

It is an object of the present invention to provide a chemiluminescent novelty eyeglass frame wherein the chemicals which must be mixed to provide chemiluminescence can be held separate and yet mixed by the user in a rather simple manner.

According to the present invention, novelty eyeglass frames have curved portions adapted to extend proximate the eyes of the user, and these curved portions are formed with channels. Compartmented ampules are adapted to be fitted within the channels and contain a chemiluminescent solution separated from an activator. The ampules contain frangible means ruptured by bending the ampule. The chemiluminescent solution and activator will thus mix to produce chemiluminescent light emanating from such frame upon bending of the ampules to insert the ampules within the channels of the curved portions of the frame.

These and other objects, and advantages and features of the present invention will become apparent from the description given below which is made in conjunction with the following drawing figures.

Figure 1:
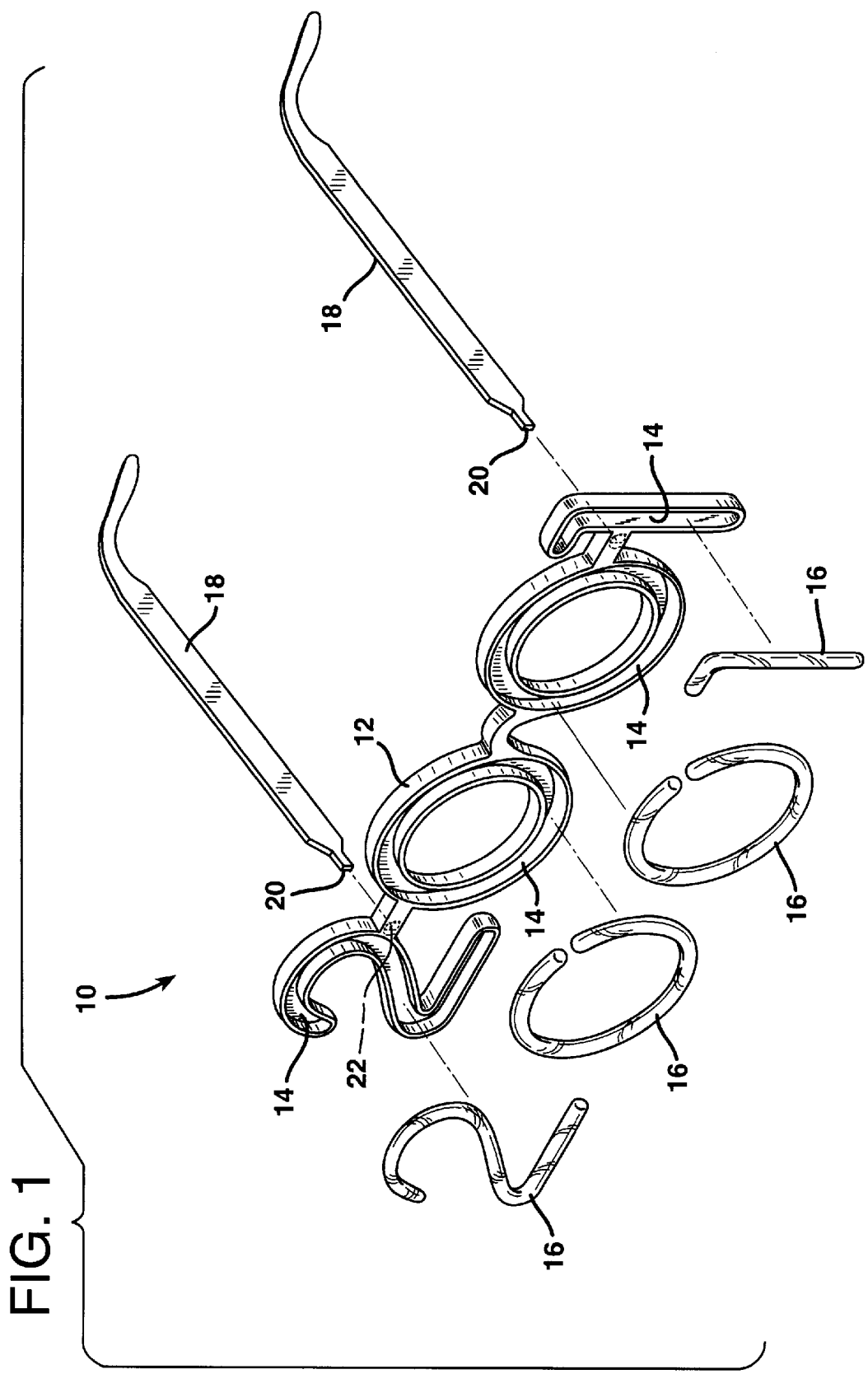
FIG. 1 is an exploded view of novelty eyeglass frames according to the present invention.
Figure 2:
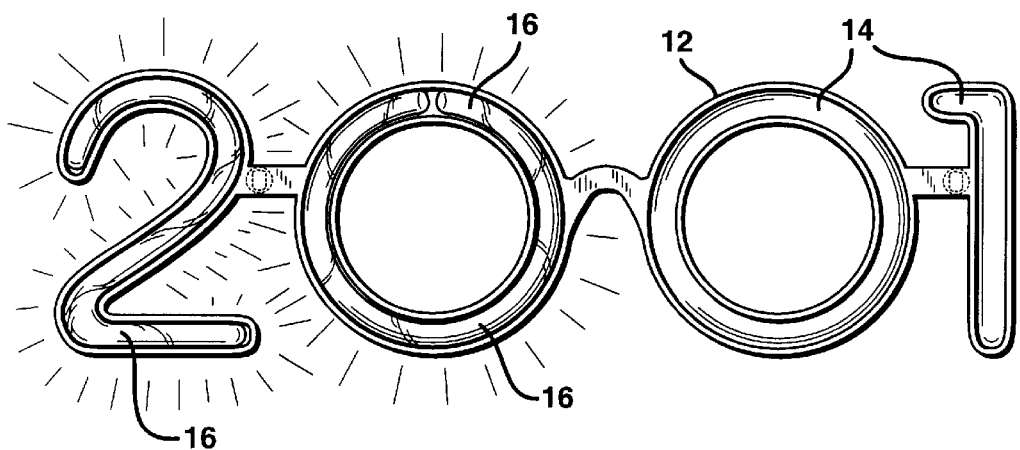
FIG. 2 is a front elevational view thereof.
Figure 3:
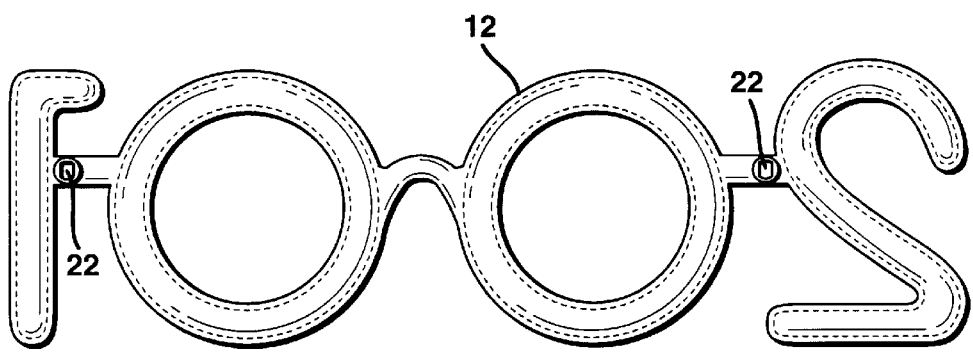
FIG. 3 is a partial rear elevational view thereof.

As illustrated in FIG. 1, the novelty eyeglass frames 10 of the present invention include a front portion 12 formed of a synthetic plastic material curved into the shape of the numerals 2001. As understood, the front portion 12 of the eyeglass frame of the present invention can have portions curved into any desirable shape; including different numerals or different novelty configurations.

Formed in a forward portion of the front portion 12 are indented channels 14 adapted to receive ampules 16 bent to fit within the respective channels 14.

Figure 4:
FIGS. 4 and 5 illustrate an ampule according to the present invention.
Figure 5:
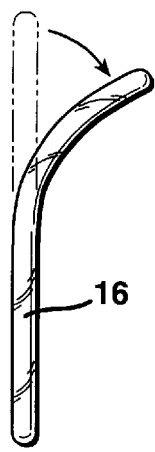
Figure 6:
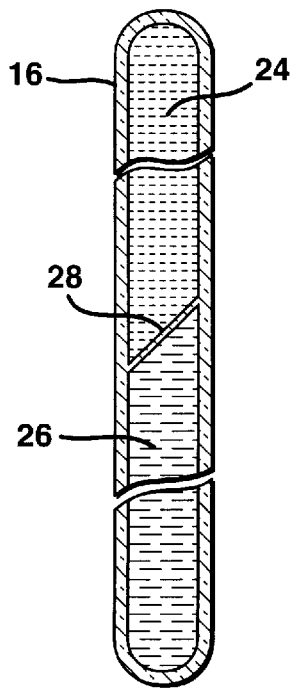
FIGS. 6 and 7 illustrate an enlarged form of the cross-section of an ampule according to the present invention.
Figure 7:
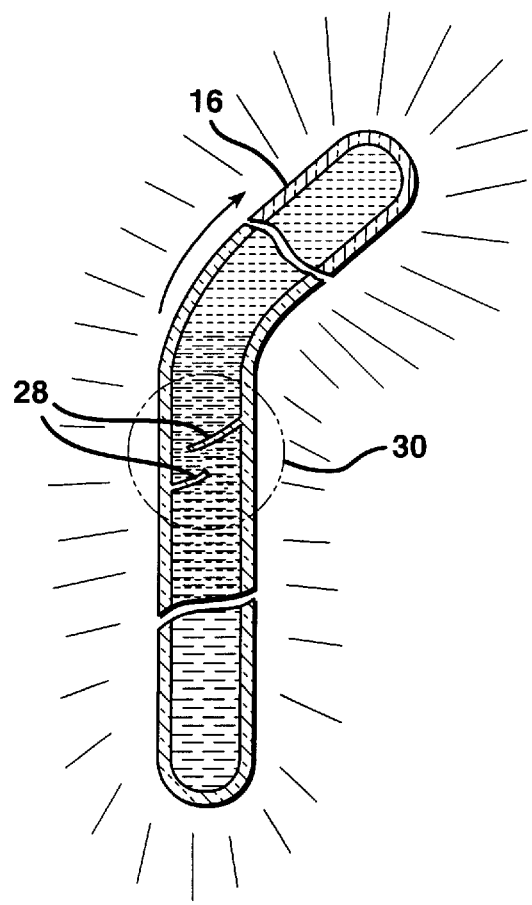

Ear stems 18 are provided and, as illustrated, may include tabular portions 20 which may press fit into mating slots 22 to complete the eyeglass frame. An ampule 16 is shown in FIGS. 4 and 5; and exploded section in FIGS. 6 and 7. The ampules 16 are formed of a flexible synthetic plastics material; and are compartmented to receive an oxalate solution 24 separated from an activator solution 26. As is understood in the chemiluminescent art, the oxalate solution 24 includes the fluorescent dye which when mixed with the activator 26 enables the mixed solution to emit chemiluminescent light. A frangible barrier 28 forms the separate compartments containing the oxalate solution 24 and the activator solution 26; and the frangible barrier is such that it will rupture as illustrate at 30 in FIG. 7 upon bending of the ampule 16 to allow the oxalate solution and activator solution to mix to emit chemiluminescent light. Consequently, the mere act of bending the ampule 16 as illustrated in FIGS. 5 and 7 to fit the ampules within the channels 22 of the eyeglass frame enables the solutions to mix to provide chemiluminescent light.

Figure 8:
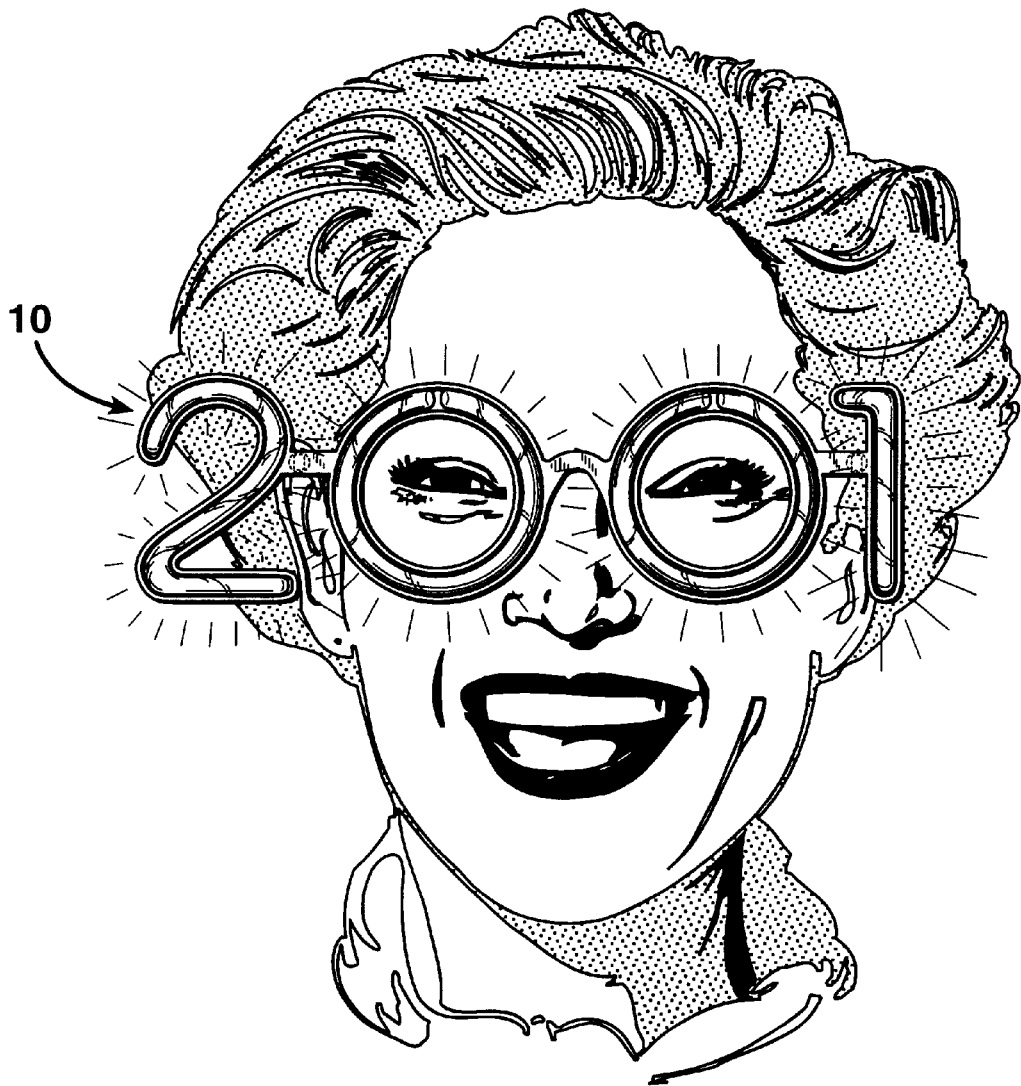
FIG. 8 illustrates the novelty eyeglass frames for the present invention being worn by a user.

In this way, the novelty eyeglass frames of the present invention can be stored in disassembled condition for shipment to reduce volume; and upon use the ear stems 18 can be inserted within the respective slots 22 and the ampules provided can be bent and fitted within the channels 14 prior to donning the eyeglass frames. The eye glass frames can, therefore, be worn as illustrated in FIG. 8 and will glow with a chemiluminescence effect as a result of the mixing of the chemicals upon rupturing of the frangible barrier 28 to bend the ampules 16 to fit within the channels 22.

As will be well understood in the art, the ampule 16 could be designed in a different manner to assure that a barrier between the two chemical solutions will be ruptured upon bending; and, for example, the ampules could be formed of concentric walls which can be ruptured upon bending; to provide an inner compartment for one of the solutions and an outer compartment surrounding the inner compartment for the other solution.

These and other objects, advantages and features of the present invention will be understood from the detailed description made above; and it is understood that the present invention is not limited by any other details set forth above, but by the appended claim.

What is claimed is:

1. A novelty eyeglass frame having curved portions adapted to extend proximate to the eyes of the wearer and formed with channels, and compartmented ampules adapted to be fitted within said channels and containing a chemiluminescent solution separated from an activator, said ampules including frangible means ruptured by bending said ampules for allowing said chemiluminescent solution and activator to mix to produce chemiluminescent light emanating from said frame upon bending of said ampules to fit within said channels.

* * * * *